(12) United States Patent
Iritsuki et al.

(10) Patent No.: US 9,496,574 B2
(45) Date of Patent: Nov. 15, 2016

(54) FUEL CELL

(71) Applicant: NISSAN MOTOR CO., LTD., Kanagawa (JP)

(72) Inventors: Keita Iritsuki, Kanagawa (JP); Yosuke Fukuyama, Kanagawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/387,557

(22) PCT Filed: Apr. 1, 2013

(86) PCT No.: PCT/JP2013/059986
§ 371 (c)(1),
(2) Date: Sep. 24, 2014

(87) PCT Pub. No.: WO2013/151019
PCT Pub. Date: Oct. 10, 2013

(65) Prior Publication Data
US 2015/0079495 A1    Mar. 19, 2015

(30) Foreign Application Priority Data
Apr. 6, 2012 (JP) .................... 2012-087420

(51) Int. Cl.
*H01M 8/10* (2016.01)
*H01M 8/02* (2016.01)

(52) U.S. Cl.
CPC ......... *H01M 8/1002* (2013.01); *H01M 8/0232* (2013.01); *H01M 8/0245* (2013.01);
(Continued)

(58) Field of Classification Search
CPC ........... H01M 8/1002; H01M 8/0232; H01M 8/0245; H01M 8/0254; H01M 8/0258; H01M 8/1004; H01M 8/1018; H01M 8/026; H01M 2008/1095; Y02E 60/521
See application file for complete search history.

(56) References Cited

U.S. PATENT DOCUMENTS 5,563,003 A * 10/1996 Suzuki ............... H01M 8/0254
429/112
6,528,199 B1    3/2003 Mercuri et al.
(Continued)

FOREIGN PATENT DOCUMENTS

JP    2003303597 A    10/2003
JP    2006501621 A    1/2006
(Continued)

OTHER PUBLICATIONS

Canadian Office Action from corresponding Canadian Patent Application No. 2,868,969 (Jan. 22, 2016).*
(Continued)

*Primary Examiner* — Gregg Cantelmo
(74) *Attorney, Agent, or Firm* — Young Basile Hanlon & MacFarlane, P.C.

(57) ABSTRACT

A fuel cell includes a membrane electrode assembly including an electrolyte membrane and catalyst layers joined on both sides of the electrolyte membrane and a pair of separators disposed at both sides of the membrane electrode assembly to respectively form gas flow spaces where two types of power generation gases flow. An electrically conductive porous substrate folded in a corrugated shape is disposed in at least one of the gas flow spaces defined on both sides of the membrane electrode assembly, and a gas flow space in which the electrically conductive porous substrate is disposed is divided into a plurality of gas flow paths substantially parallel to a flow direction of the power generation gases.

8 Claims, 13 Drawing Sheets

(52) U.S. Cl.
CPC ......... *H01M 8/0254* (2013.01); *H01M 8/0258* (2013.01); *H01M 8/1004* (2013.01); *H01M 8/1018* (2013.01); *H01M 8/026* (2013.01); *H01M 2008/1095* (2013.01); *Y02E 60/521* (2013.01)

(56) References Cited

U.S. PATENT DOCUMENTS

| | | | |
|---|---|---|---|
| 7,776,491 B2 * | 8/2010 | Takada | H01M 8/0267 429/517 |
| 7,846,591 B2 * | 12/2010 | Gu | C22C 29/00 429/414 |
| 2003/0108731 A1 | 6/2003 | Mercuri et al. | |
| 2004/0072055 A1 | 4/2004 | Getz et al. | |
| 2005/0221146 A1 | 10/2005 | Horiguchi | |
| 2005/0244702 A1 | 11/2005 | Horiguchi | |
| 2010/0040926 A1 | 2/2010 | Blanchet et al. | |
| 2011/0287334 A1 * | 11/2011 | Tanaka | H01M 4/8626 429/480 |
| 2013/0149633 A1 * | 6/2013 | Jeong | H01M 8/0267 429/514 |
| 2014/0045097 A1 * | 2/2014 | Min | H01M 8/0254 429/517 |

FOREIGN PATENT DOCUMENTS

| | | |
|---|---|---|
| JP | 2009193845 A | 8/2009 |
| JP | 2010073563 A | 4/2010 |
| JP | 2011048936 A | 3/2011 |
| WO | 2010061703 A | 6/2010 |

OTHER PUBLICATIONS

Translation of the Written Opinion of the International Searching Authority dated May 14, 2013, for International Application No. PCT/JP2013/059986.

* cited by examiner

FUEL CELL

CROSS REFERENCE TO RELATED APPLICATION

The present application claims priority to Japanese Patent Application No. 2012-087420, filed Apr. 6, 2012 and incorporated herein in its entirety.

TECHNICAL FIELD

The present invention relates to, for example, a polymer electrolyte fuel cell.

BACKGROUND

A polymer electrolyte fuel cell is disclosed in International Publication No. WO 2010/061703A and includes: a polymer electrolyte membrane; an electrode catalyst layer disposed on one face of the polymer electrolyte membrane; an electrically conductive separator for sealing a power generation gas; and an electrode member disposed between the electrode catalyst layer and the separator to form an electrode along with the electrode catalyst layer, wherein the electrode member includes a first contact portion that is in direct contact with the electrode catalyst layer, a second contact portion that is in direct contact with the separator, and a gas diffusion path where the gas flows, and wherein the electrode member is composed of an electrically conductive plate member that has a number of open holes and is folded in a corrugated shape.

SUMMARY

In the above-described "polymer electrolyte fuel cell" described in International Publication No. WO 2010/061703A, the electrically conductive porous member enables a reduction of transfer resistance of the power generation gas. However, it allows the power generation gas to flow also in a direction crossing the flow direction in an active area, which results in uneven flow distribution.

Therefore, it is an object of the present invention to provide a fuel cell that can reduce transfer resistance of the power generation gas and also improve unevenness of the flow distribution in an active area by restricting the power generation gas from flowing in a direction crossing the flow direction of the power generation gas.

The present invention for solving the above-described problem is a fuel cell that comprises: a membrane electrode assembly comprising an electrolyte membrane and catalyst layers joined on both sides of the electrolyte membrane; and a pair of separators disposed at both sides of the membrane electrode assembly to respectively form gas flow spaces where two types of power generation gases flow, wherein an electrically conductive porous substrate and a gas flow path dividing member are disposed in at least one of the gas flow spaces defined on both sides of the membrane electrode assembly, wherein the electrically conductive porous substrate is folded in a corrugated shape, and the gas flow path dividing member divides a gas flow space into a plurality of gas flow paths substantially parallel to a flow direction of the power generation gases.

With this configuration, the power generation gases flowing in the gas flow spaces does not deteriorate its flow distribution because the power generation gases flowing through the gas flow paths are restricted from flowing in a direction crossing the flow direction of the power generation gases. Further, the electrically conductive porous substrate folded in a corrugated shape reduces transfer resistance of the power generation gases.

The present invention can improve unevenness of the flow distribution in the active area, and can also reduce transfer resistance of the power generation gases by restricting the power generation gases from flowing in a direction crossing the flow direction of the power generation gases.

DESCRIPTION OF EMBODIMENTS

Figure 1:
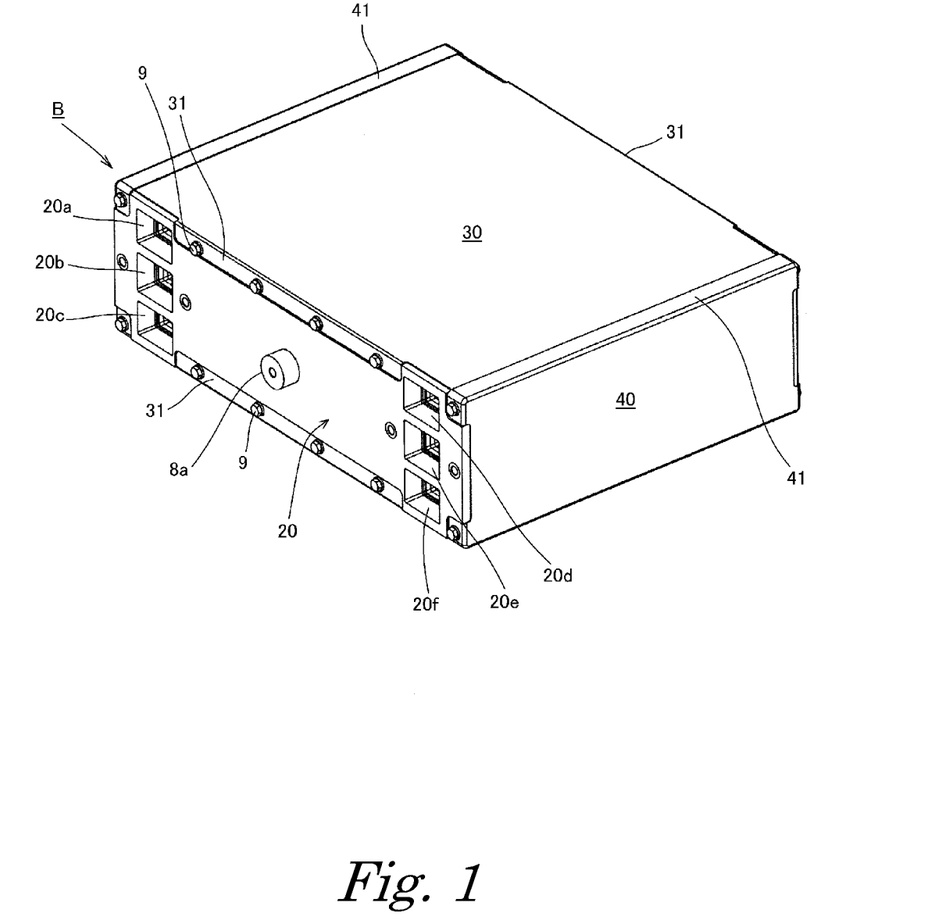
FIG. 1 is a perspective view of a fuel cell stack that uses fuel cells according to a first embodiment of the present invention.

Hereinafter, embodiments of the present invention will be described with reference to the drawings. FIG. 1 is a perspective view of a fuel cell stack that uses fuel cells according to a first embodiment of the present invention, and FIG. 2 is an exploded perspective view of the fuel cell stack.

Figure 2:
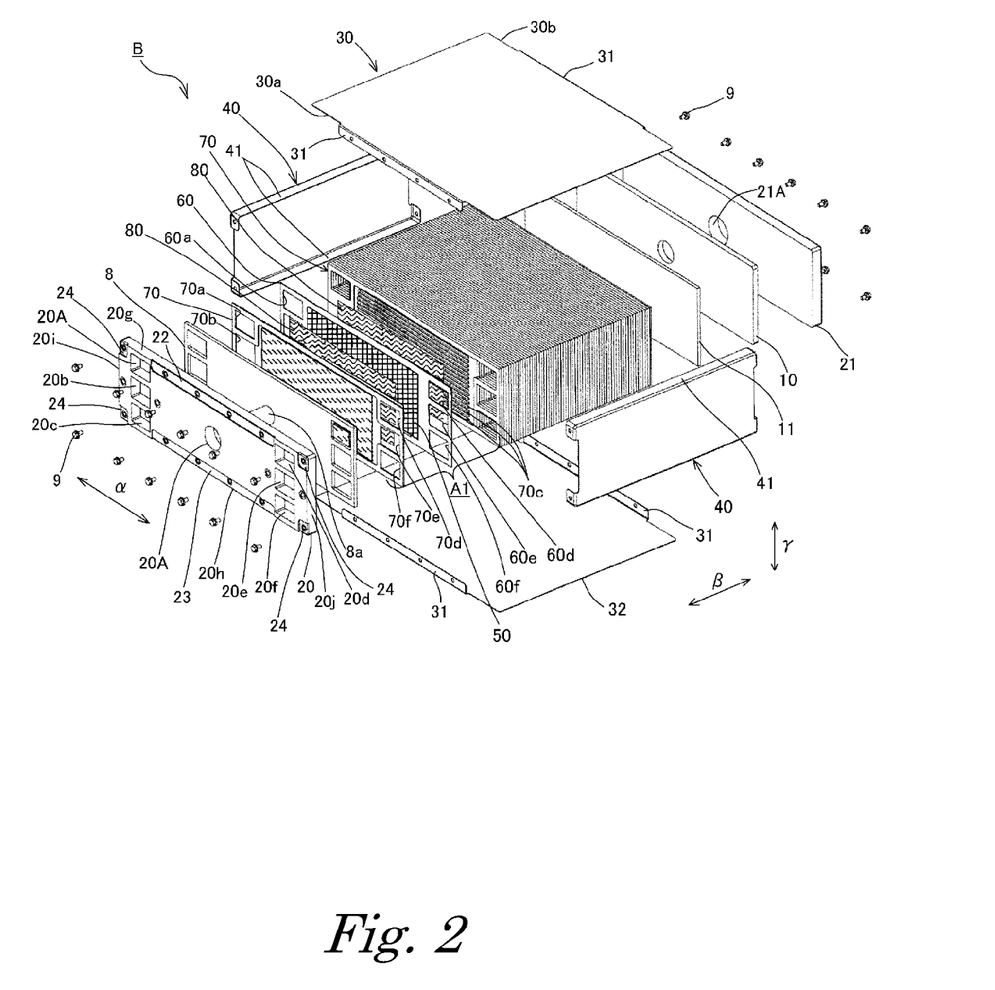
FIG. 2 is an exploded perspective view of the fuel cell stack.

As illustrated in FIGS. 1 and 2, the fuel cell stack B is configured such that current collector plates 8, 11 and a plurality of fuel cells A1 according to the first embodiment of the present invention are stacked between a pair of end plates 20, 21, and they are fastened by fastening plates 30, 32 and reinforcing plates 40, 40 so that the end plates 20, 21 presses the fuel cells A1 between them.

The end plate 20 of this embodiment, which is made of a synthetic resin, has a desired thickness, and is formed in a rectangular shape that is longer in the horizontal direction α (flow direction of the power generation gases). At the center of the end plate 20, an electrode hole 20A is formed to allow an electrode 8a of the current collector plate 8 to protrude outside.

Further, at the respective ends in the horizontal direction α, a cathode inlet opening 20a, a cooling fluid inlet opening 20b and an anode outlet opening 20c, and an anode inlet opening 20d, a cooling fluid outlet opening 20e and a cathode outlet opening 20f are arranged opposite to manifold holes 60a to 60c and manifold holes 60d to 60f (described below) for supplying/discharging hydrogen-containing gas, oxygen-containing gas and cooling fluid.

At an upper edge 20g and a lower edge 20h of the end plate 20, an attaching recess 22 and an attaching recess 23 for attaching fastening-locking pieces 31, 31 of the fastening plates 30, 30 (described in more detail below) are formed.

At edges 20i, 20j in the horizontal direction α of the end plate 20, attaching recesses 24, 24 for locking pieces 41, 41 of the reinforcing plate 40, 40 (described in more detail below) are formed.

The end plate 21 is formed in the same shape and size as the above-described end plate 20. At the center thereof, an electrode hole 21A is formed. At the edges thereof, recesses similar to the recesses 22 to 24 of the end plate 20 are formed respectively (not shown). Portions that are similar to those of the above-described end plate 20 are referred by the same reference signs, and the description thereof is omitted.

The fastening plate 30 is formed in a horizontally long rectangular shape in a plan view. At edges 30a, 30b, the fastening-locking pieces 31, 31 having a desired length and a constant width are formed by being folded downward in the figure. The fastening plate 32 is formed in the same horizontally long rectangular shape as the fastening plate 30. At the edges, the fastening-locking pieces 31, 31 having a desired length and a constant width are formed by being folded upward in the figure.

The reinforcing plates 40 are provided for preventing a flexure of the plurality of fuel cells A1 that are laminated together. The reinforcing plates 40 are formed in a horizontally long rectangular shape in a side view. At the edges thereof on the upper and lower ends in the figure, locking and fastening pieces 41, 41 are formed in a constant width over the entire edges. In FIGS. 1 and 2, reference signs 9 and 10 designate bolts and spacers respectively.

Figure 3A:
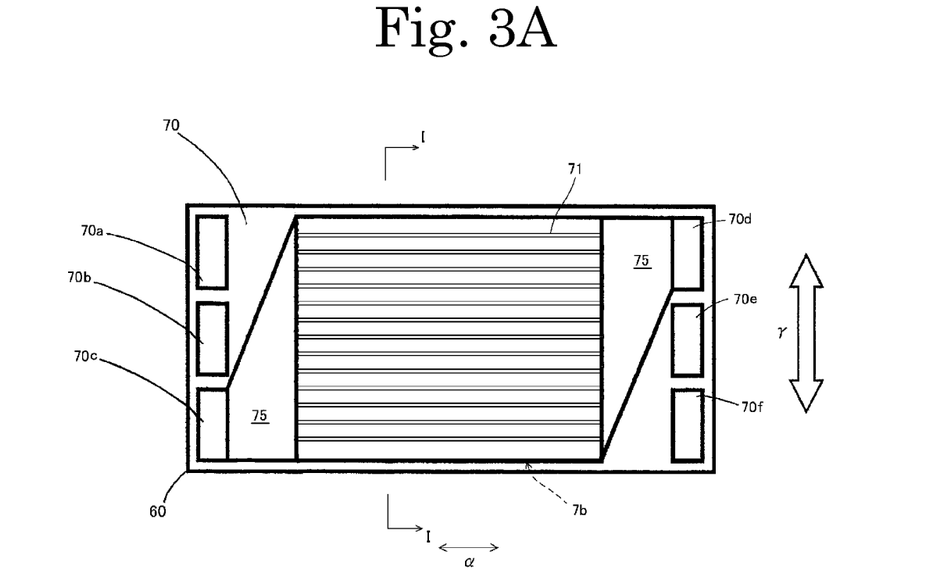
FIG. 3A a front view of one of separators of a fuel cell according to the first embodiment of the present invention, illustrating the structure thereof.
Figure 3B:
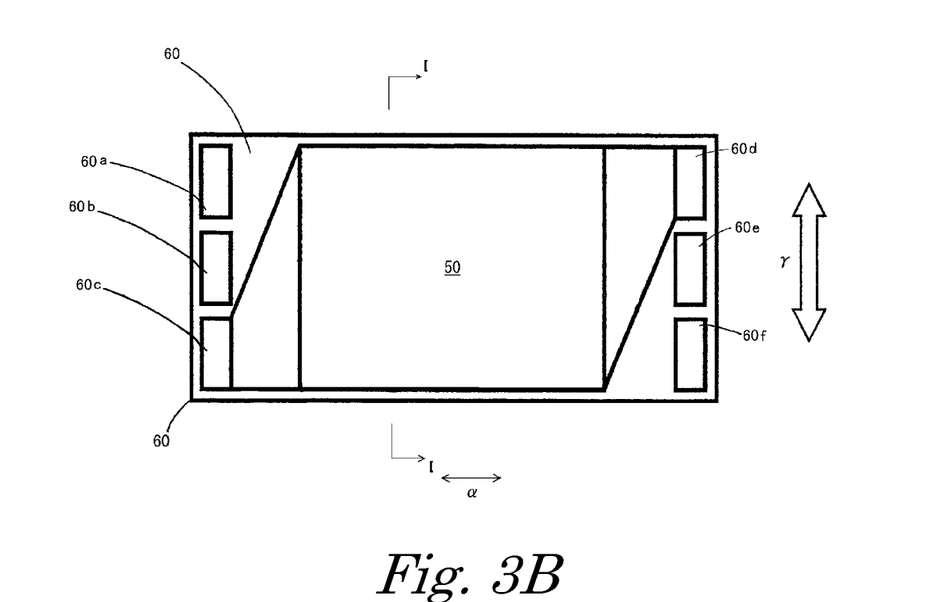
FIG. 3B is a front view of a frame of the fuel cell according to the first embodiment of the present invention, illustrating the structure thereof.
Figure 4:
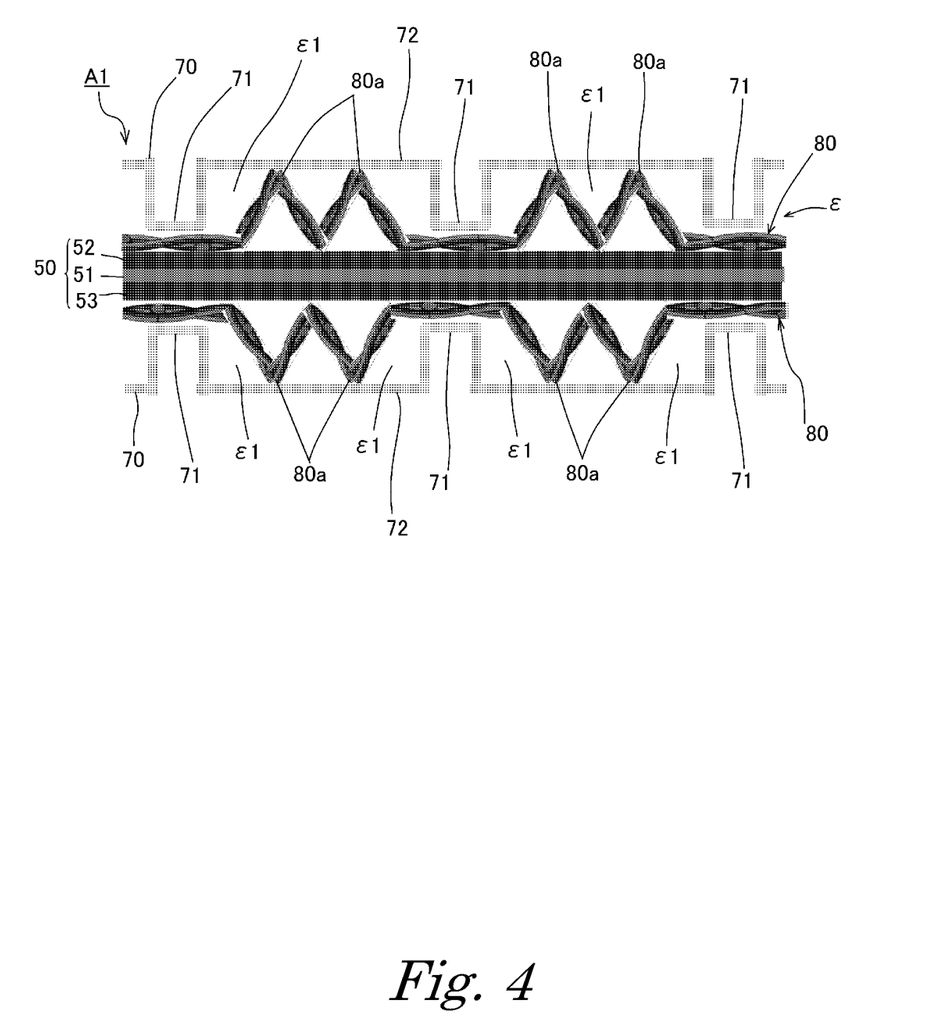
FIG. 4 is a partial enlarged cross sectional view illustrating a partial enlargement of the section taken along the line I-I of FIG. 3(A), and illustrates a fuel cell that includes one of separators of the fuel cell according to the first embodiment of the present invention as illustrated in FIG. 3(A), the frame according to the first embodiment of the present invention as illustrated in FIG. 3(B), the other of the separators, and an electrically conductive porous substrate.
Figure 5A:
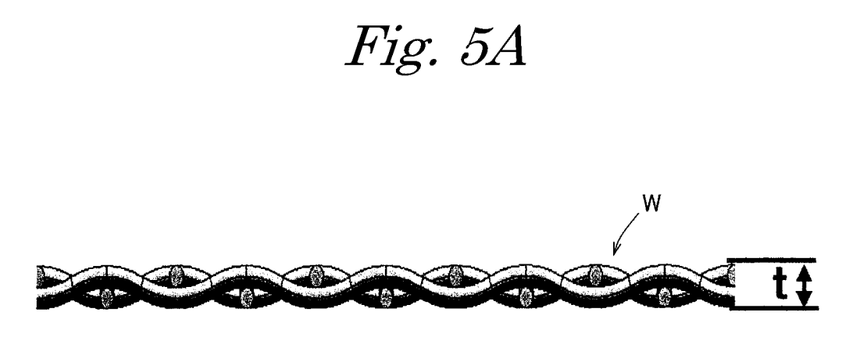
FIG. 5A is an explanatory view illustrating the figure of a metal mesh, which is an example of the electrically conductive porous substrate, before rolling.
Figure 5B:
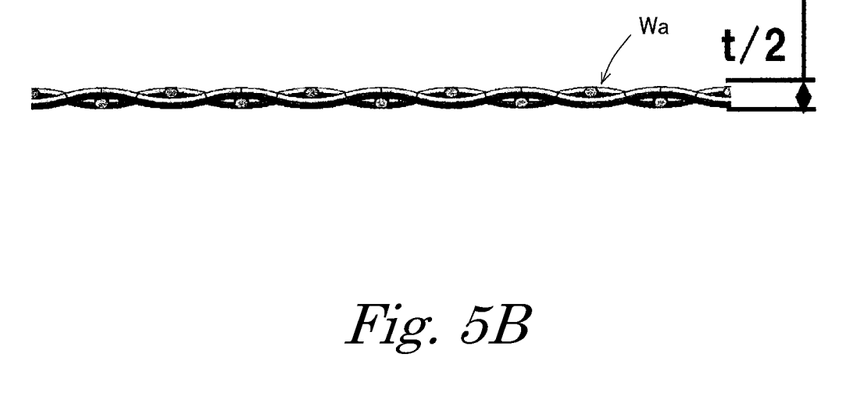
FIG. 5B is an explanatory view of the figure of a metal mesh after rolling.

FIG. 3 is: (A) a front view of one of separators of the fuel cell according to the first embodiment of the present invention, illustrating the structure thereof; and (B) a front view of a frame of the fuel cell according to the first embodiment of the present invention, illustrating the structure thereof. FIG. 4 is a partial enlarged cross sectional view illustrating a partial enlargement of the section taken along the line I-I of FIG. 3(A), and illustrates a fuel cell that includes one of the separators of the fuel cell according to the first embodiment of the present invention as illustrated in FIG. 3(A), the frame according to the first embodiment of the present invention as illustrated in FIG. 3(B), the other of the separators, and an electrically conductive porous substrate. FIG. 5 is explanatory views illustrating: (A) the figure of a metal mesh, which is an example of the electrically conductive porous substrate, before rolling; and (B) the figure of the metal mesh after rolling.

Each fuel cell A1 according to the first embodiment of the present invention is configured such that a pair of separators 70, 70 is disposed on both sides of a membrane electrode assembly 50 on a frame 60 so as to form respective gas flowing areas ε where two types of power generation gases flow. The "power generation gases" are hydrogen-containing gas and oxygen-containing gas.

The frame 60 is made of a resin. In this embodiment, the frame 60 is formed in a horizontally long rectangular shape in a front view from the lamination direction β of the fuel cells A1 (see FIG. 1), and has an approximately uniform plate thickness. At the center part thereof, the membrane electrode assembly 50 is disposed.

The membrane electrode assembly 50, which is also referred to as an MEA, is a laminate of an electrolyte membrane 51 made of, for example, a solid polymer and catalyst layers 52, 53 of, for example, a supported platinum catalyst.

At respective side ends of the membrane electrode assembly 50 on the frame 60, the manifold holes 60a to 60c and the manifold holes 60d to 60f for supplying/discharging the hydrogen containing gas, the oxygen containing gas and cooling fluid are formed as illustrated in FIG. 3(B).

The manifold holes 60a to 60c are provided respectively for supplying the hydrogen-containing gas, for discharging the cooling fluid, and for discharging the oxygen-containing gas. The manifold holes 60d to 60f are provided respectively for supplying the oxygen-containing gas, for supplying the cooling fluid, and for discharging the hydrogen-containing gas.

The separators 70, 70 are press-molded metal plates of stainless steel or the like. They are formed in a horizontally long rectangular shape of the same shape and size as the frame 60. At positions opposite to the manifold holes 60a to 60c, 60d to 60f, similar manifold holes 70a to 70c, 70d to 70f, 70a to 70c, 70d to 70f are formed.

The center parts of the separators 70 opposite to the membrane electrode assembly 50 are formed in an uneven shape so that a plurality of gas flow path dividing members (hereinafter referred to as "ribs") 71 are formed substantially parallel to the flow direction α of the power generation gases (the above-described horizontal direction). They divide the gas flow spaces ε into a plurality of gas flow paths ε1 that are substantially parallel to the flow direction α of the power generation gases.

The ribs 71 may be formed at either regular or irregular pitches. It is preferred to set the pitch as wide as possible, for example to 2 mm or more, as long as the power generation gases are properly distributed. "Active areas 76" refer to areas opposite to the membrane electrode assembly 50. On the front faces of the separators 70, 70, diffuser portions 75 where the oxygen-containing gas or the hydrogen containing gas flows are formed from the manifold holes 70c, 70d to the active areas 76.

In this embodiment, electrically conductive porous substrates 80 are disposed in both gas flow spaces ε, ε that are defined on both sides of the membrane electrode assembly 50. The electrically conductive porous substrates 80 include folded portions 80a that are folded in a corrugated shape in the areas opposite to the gas flow paths ε1. The folded portions 80a are disposed in every gas flow path ϵ1. In this embodiment, two folded portions 80a, 80a are housed in each gas flow path ϵ1. However, the arrangement is not limited thereto.

The electrically conductive porous substrates 80 may be made of a material having a flexural (tensile) strength of 10 MPa or more, such as a knitted or weaved mesh, a mesh of bonded threads, a porous plate and an expanded metal. In this embodiment, the electrically conductive porous substrates 80 are made of a metal mesh Wa, which is formed by rolling a metal mesh W of FIG. 5(A) in the direction of reducing the plate thickness as illustrated in FIG. 5(B). The rolling reduction of the metal mesh Wa may be approximately 50% (t/2) as illustrated in FIG. 5(B). However, a higher rolling reduction is preferred.

The use of the rolled metal mesh can reduce the thickness of the components of each fuel cell A1, which can reduce the pitch of the laminated fuel cells A1. Further, resulting work hardening and an increase in density increase the mesh strength and also improve the flatness of the metal mesh Wa, which can decrease a mechanical input to the membrane electrode assembly and improve unevenness of the cell surface pressure due to the uneven shape of the metal mesh. The corrugation of the folded portions 80a of the electrically conductive porous substrates 80 may be triangular wave, sine curve, normal corrugation or the like.

The fuel cell A1 having the above-described configuration can provide the following advantageous effects.

When the power generation gases flow through the gas flow spaces ϵ, if there was no rib 71, the power generation gases would follow the shortest route between the supplying manifold hole and the discharging manifold hole. As a result, the power generation gases would not be diffused over the entire active areas, which would result in uneven flow distribution. In contrast, the ribs 71 divide the gas flow spaces S into the plurality of gas flow paths ϵ1 substantially parallel to the flow direction ϵ of the power generation gases. This can suppress the gases from flowing in a direction crossing the gas flow direction, and thereby can improve unevenness of the flow distribution in the active areas.

The electrically conductive substrates 80 allow migration of electrons, and thereby decreases transfer resistance of the power generation gases.

The wider the pitch of the ribs 71 is, the greater the reduction of transfer resistance of the power generation gases can be due to greater ratio of the flow paths.

Figure 6:
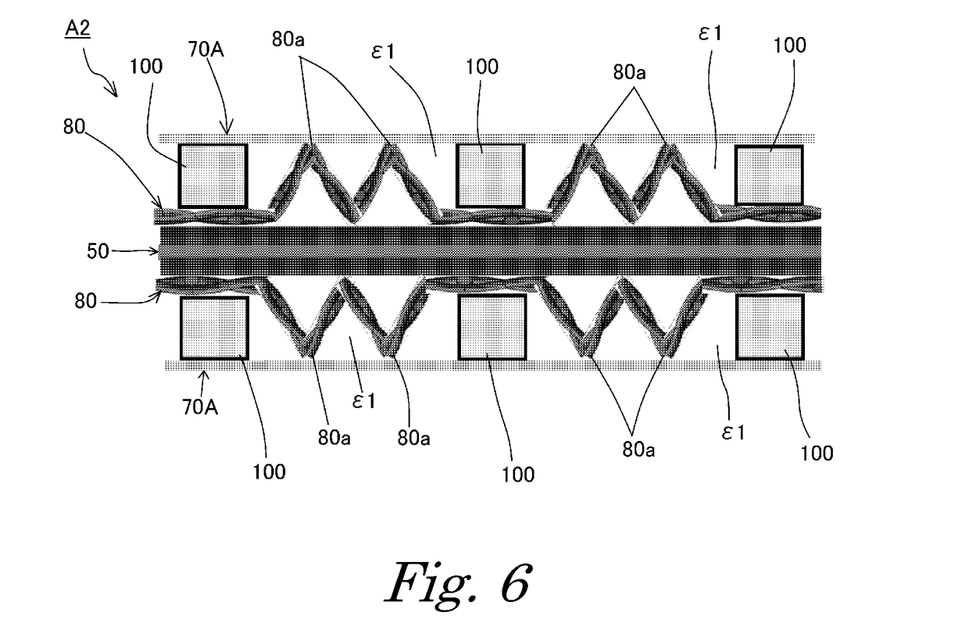
FIG. 6 is a partial enlarged cross sectional view of a fuel cell according to a second embodiment, which corresponds to a part of the section taken along the line I-I of FIG. 3(A).
Figure 7A:
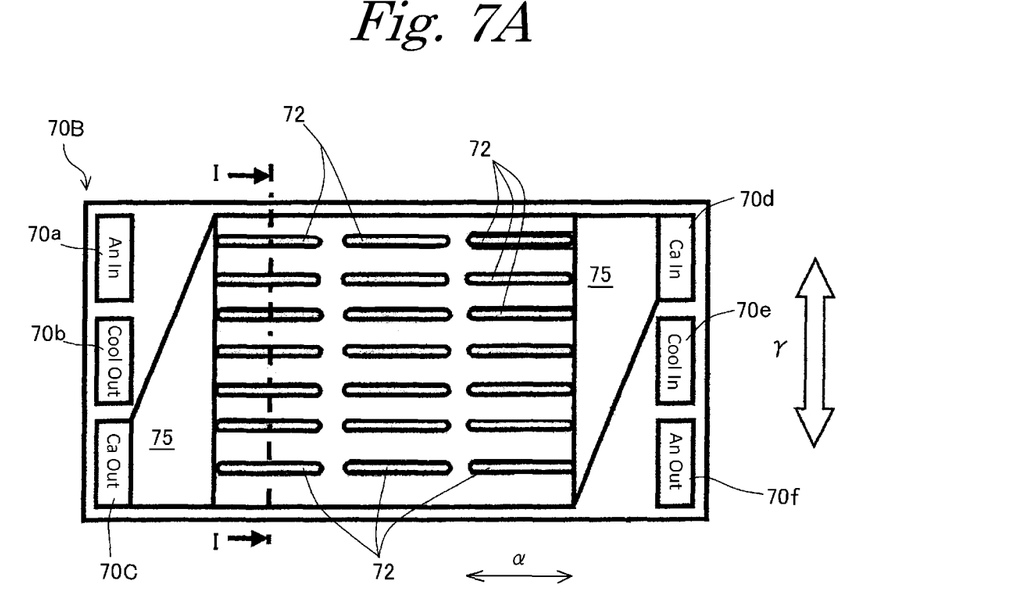
FIG. 7A is a front view of one of separators of a fuel cell according to a third embodiment of the present invention.
Figure 7B:
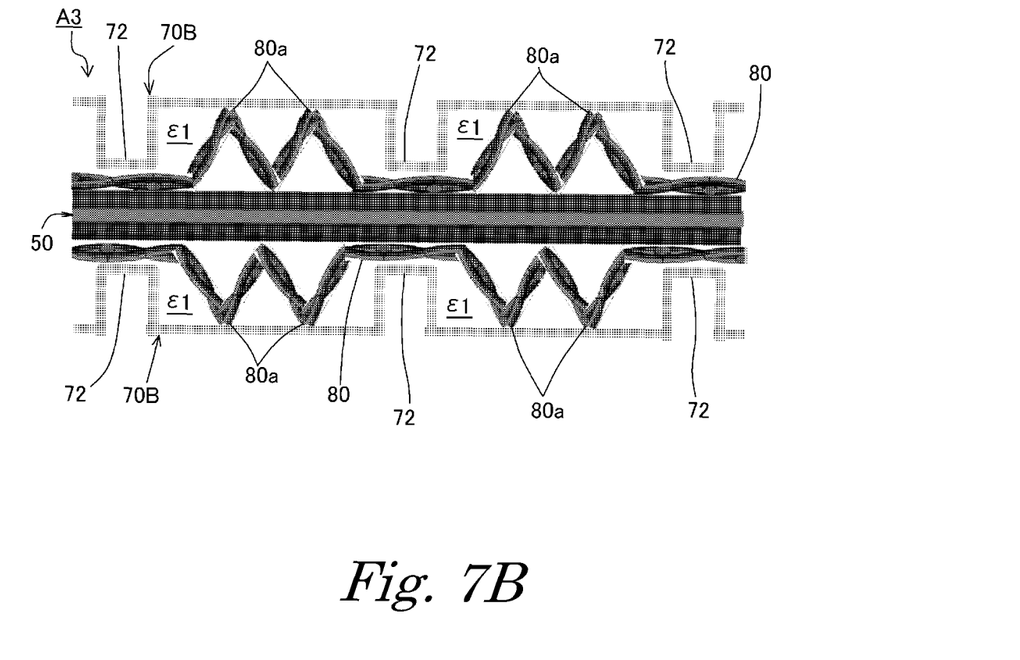
FIG. 7B is a partial enlarged cross sectional view illustrating a part of the section taken along the line I-I of FIG. 7(A) and illustrate the fuel cell that includes the separator, the other of the separators, a frame, and an electrically conductive porous substrate.

Next, fuel cells of second and third embodiments will be described with reference to FIGS. 6 and 7. FIG. 6 is a partial enlarged cross sectional view of the fuel cell according to the second embodiment, which corresponds to a part of the section taken along the line I-I of FIG. 3 (A). FIG. 7 is: (A) a front view of one of separators of the fuel cell according to the third embodiment of the present invention; and (B) is a partial enlarged cross sectional view illustrating a part of the section taken along the line I-I of FIG. 7(A) and illustrates a fuel cell that includes the separator of the fuel cell, the other of the separators, a frame, and an electrically conductive porous substrates. In FIGS. 6 and 7, components that are similar to those of the above-described embodiment are referred by the same reference signs, and the description thereof is omitted.

The fuel cell A2 according to the second embodiment as illustrated in FIG. 6 has the same basic structure as the above-described fuel cell A1, except that flat plate separators 70A, 70A are used in replace of the separators 70, 70, and gas flow path dividing members 100, 100 made of an electrically conductive material and having a square cross-sectional shape are joined to the separators 70A, 70A. In this embodiment, the gas flow path dividing members 100, 100 divide the gas flow spaces ϵ into gas flow paths ϵ1.

The fuel cell A3 according to the third embodiment as illustrated in FIG. 7 is different from the above-described fuel cell A1 in the configuration of the separators.

The center parts (active areas 76) of the separators 70B, 70B opposite to the membrane electrode assembly 50 have an uneven shape by being embossed with slot shapes so that a plurality of ribs 72 (gas flow path dividing members) are formed substantially parallel to the flow direction α of the power generation gases. They divide the gas flow spaces ϵ into a plurality of gas flow paths ϵ1 substantially parallel to the flow direction of the power generation gases.

Figure 8:
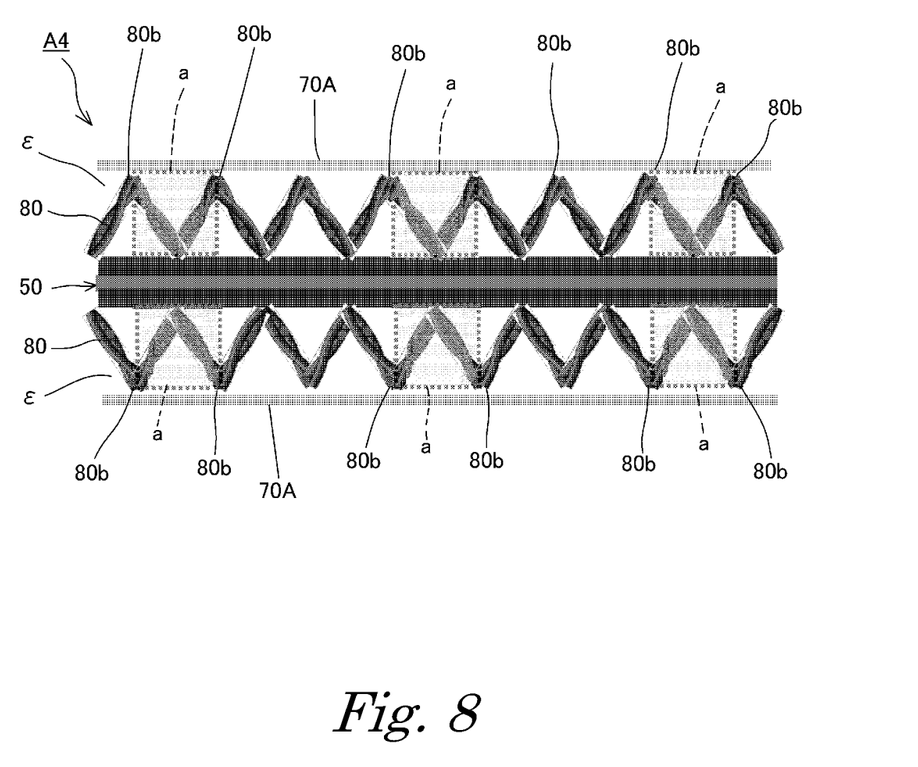
FIG. 8 is a partial enlarged cross sectional view of a fuel cell according to a fourth embodiment, which corresponds to a part of the section taken along the line I-I of FIG. 3(A).
Figure 9:
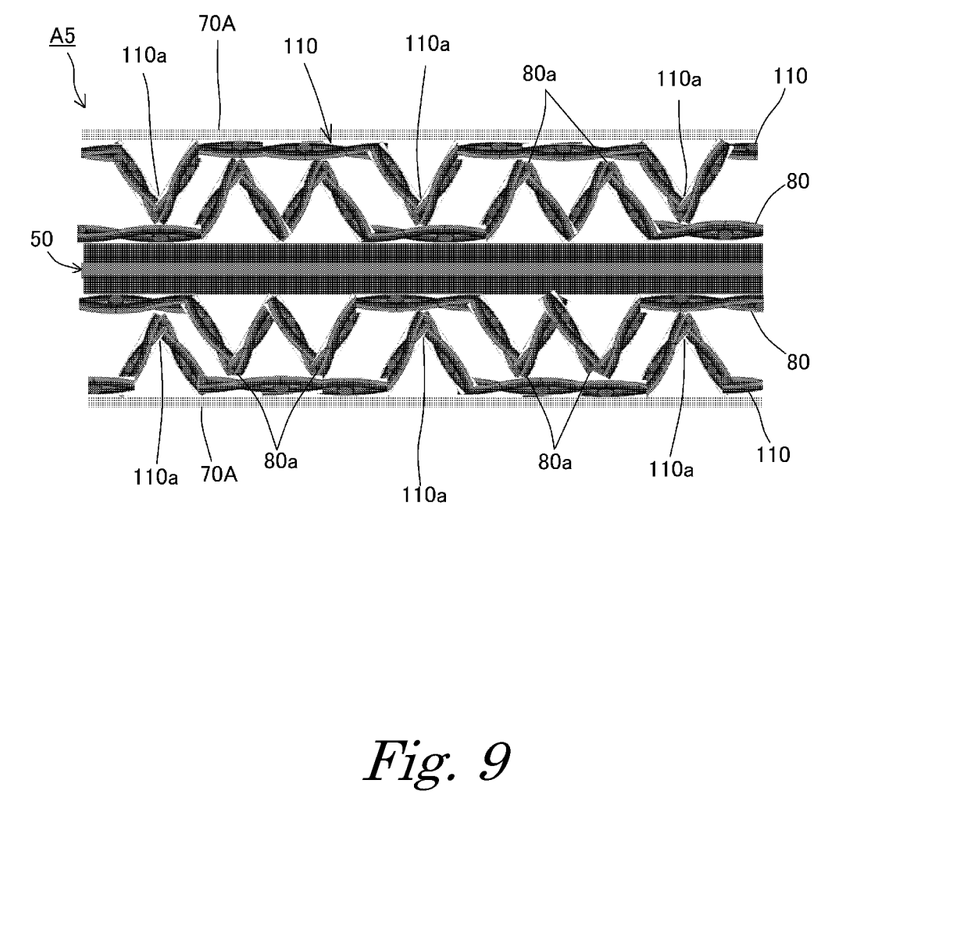
FIG. 9 is a partial enlarged cross sectional view of a fuel cell according to a fifth embodiment, which corresponds to a part of the section taken along the line I-I of FIG. 3(A).
Figure 10:
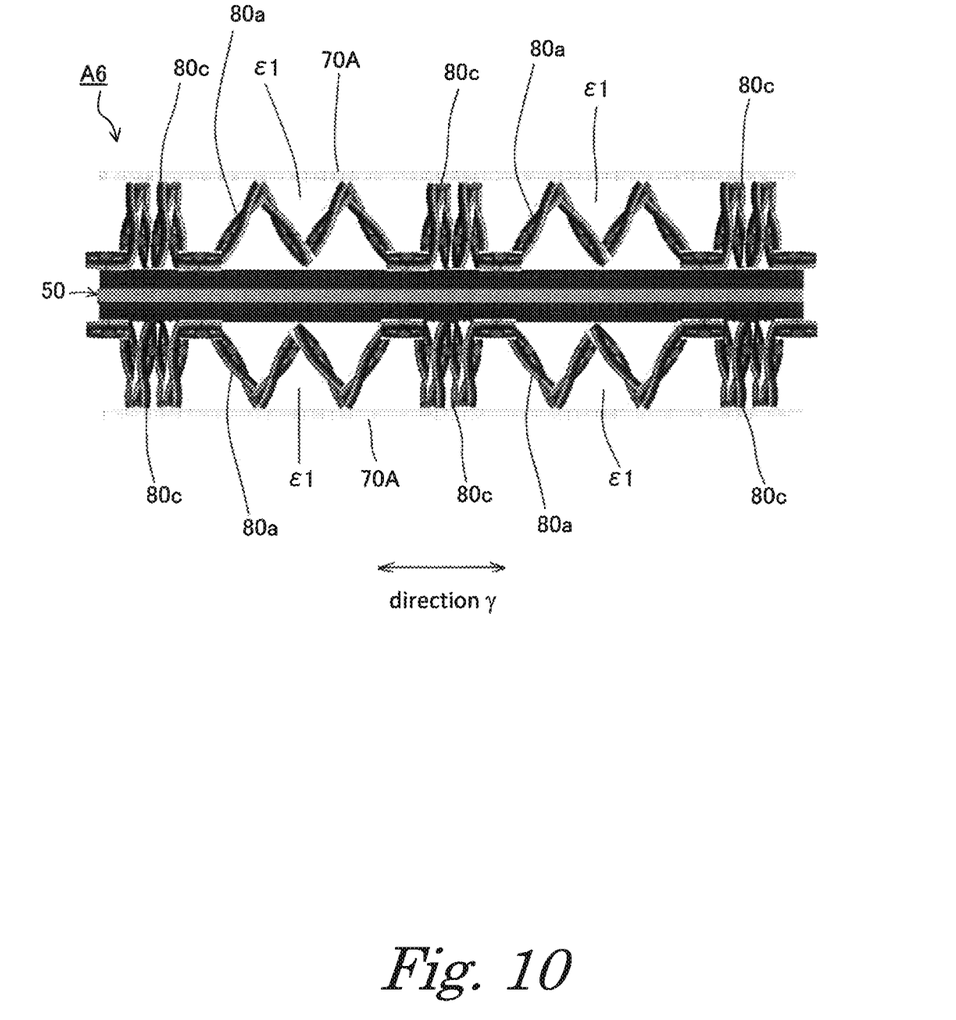
FIG. 10 is a partial enlarged cross sectional view of a fuel cell according to a sixth embodiment, which corresponds to a part of the section taken along the line I-I of FIG. 3(A).

Next, fuel cells according to fourth to sixth embodiments will be described with reference to FIGS. 8 to 10. FIGS. 8 to 10 are partial enlarged cross sectional views of fuel cells according to fourth to sixth embodiments, which correspond to a part of the section taken along the line I-I of FIG. 3(A). The fuel cell A4 according to the fourth embodiment as illustrated in FIG. 8 includes the above-described flat plate separators 70A, 70A, and also includes electrically conductive porous substrates 80 that have folded portions 80b folded in a corrugated shape, and is disposed in gas flow spaces ϵ. Gas flow path dividing members are formed such that the electrically conductive porous substrates 80 have lower aperture ratio at the portions "a" corresponding to the above-described ribs 71 than at the other portions. This configuration eliminates forming something that corresponds to the above-described ribs 71. Alternatively, the portions "a" corresponding to the above-described ribs 71 may be made of a resin mold.

The fuel cell A5 according to the fifth embodiment as illustrated in FIG. 9 includes the above-described flat plate separators 70A, 70A, and also includes flow path dividing members 110 that are interposed between electrically conductive porous substrates 80, 80 and the separators 70A, 70A. The flow path dividing members 110 are made of an electrically conductive porous substrate, and have an aperture ratio lower than the electrically conductive porous substrates 80. Further, the flow path dividing members 110 have folded portions 110a (gas flow path dividing members) folded in a corrugated shape at the portions corresponding to the ribs 71. In other words, the aperture ratio is lower at the portions corresponding to the ribs 71.

The fuel cell A6 according to the sixth embodiment as illustrated in FIG. 10 includes flat plate separators 70A, 70A, and also employs folded portions 80c of electrically conductive porous substrates 80, 80 that have higher density at the portions corresponding to the above-described ribs 71. That is, the folded portions 80c have a shorter length in the corrugation direction (direction γ) than folded portions 80a so that the electrically conductive porous substrate is packed at a higher density in the portions corresponding to the ribs 71.

Figure 11:
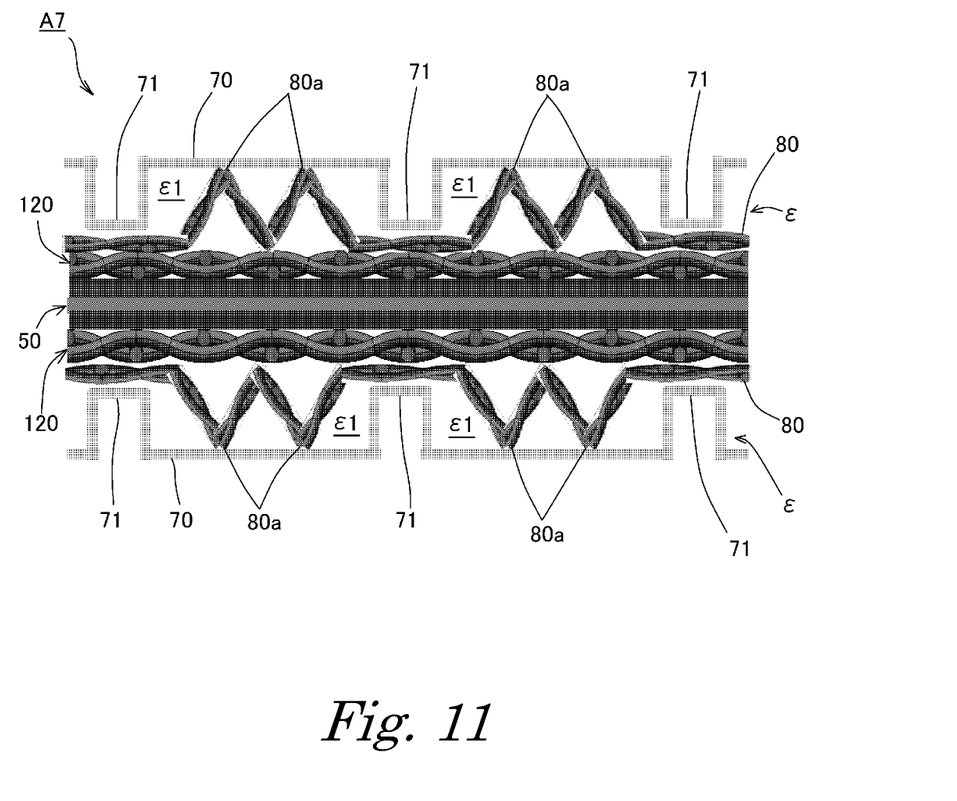
FIG. 11 is a partial enlarged cross sectional view of a fuel cell according to a seventh embodiment, which corresponds to a part of the section taken along the line I-I of FIG. 3(A).

Next, a fuel cell according to a seventh embodiment will be described with reference to FIG. 11. FIG. 11 is a partial enlarged cross sectional view of the fuel cell according to the seventh embodiment, which corresponds to a part of the section taken along the line I-I of FIG. 3(A). Components that are similar to those of the above-described embodiments are referred by the same reference signs, and the description thereof is omitted.

The fuel cell A7 according to the seventh embodiment is configured such that supports 120, 120 are interposed between electrically conductive porous substrates 80, 80 disposed in both gas flow spaces ∈, ∈ and a membrane electrode assembly 50. The supports 120 are made of an electrically conductive porous substrate. Specifically, the above-described metal mesh Wa as illustrated in FIG. 5 is employed.

The supports 120 are not limited to a metal mesh, but may be made of other non-conductive porous substrate whose surface is covered with a metal. Specific examples thereof include metal-plated resin meshes as well as metal meshes, porous plates, punching metals, expanded metals and the like.

With the above-described supports 120, the following advantageous effects can be obtained.

Since the contact points of the folded portions 80a of the corrugated metal mesh have a small contact area, a large stress is locally caused on the membrane electrode assembly 50 due to a surface pressure or the like during assembly, and the membrane electrode assembly 50 may be broken by the stress. However, the interposed supports can decrease the stress.

When a corrugated metal mesh is used, electrons have to migrate in the membrane electrode assembly 50, which has a relatively high electrical resistance, in the in-plane direction over a distance of up to a half of the corrugation pitch. However, by interposing the supports 120, electrons can migrate in the surface layer and the inside of the supports. This can decrease the electrical resistance of the whole fuel cell.

Figure 12:
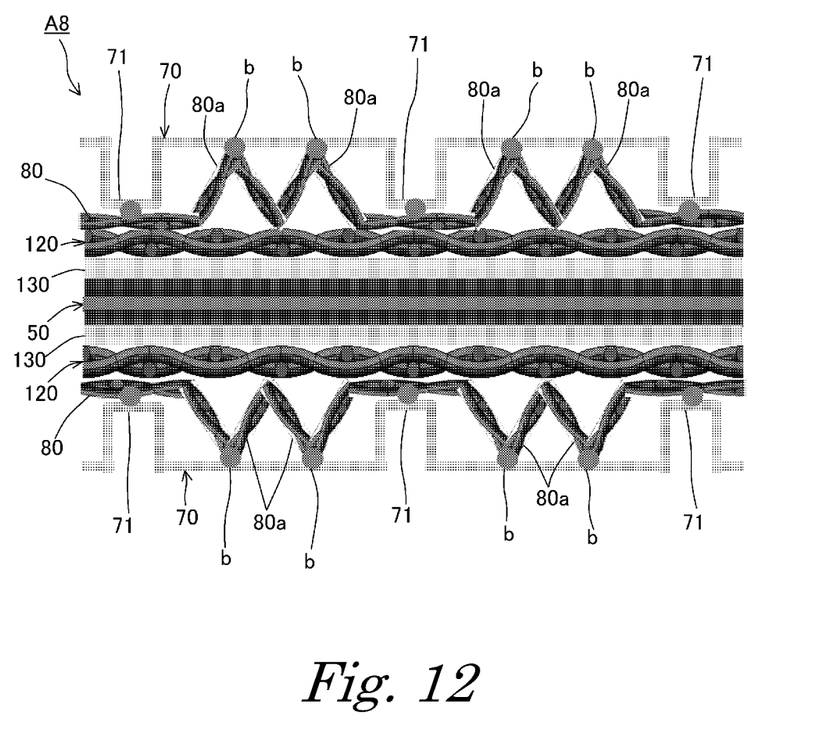
FIG. 12 is a partial enlarged cross sectional view of a fuel cell according to an eighth embodiment, which corresponds to a part of the section taken along the line I-I of FIG. 3(A).
Figure 13:
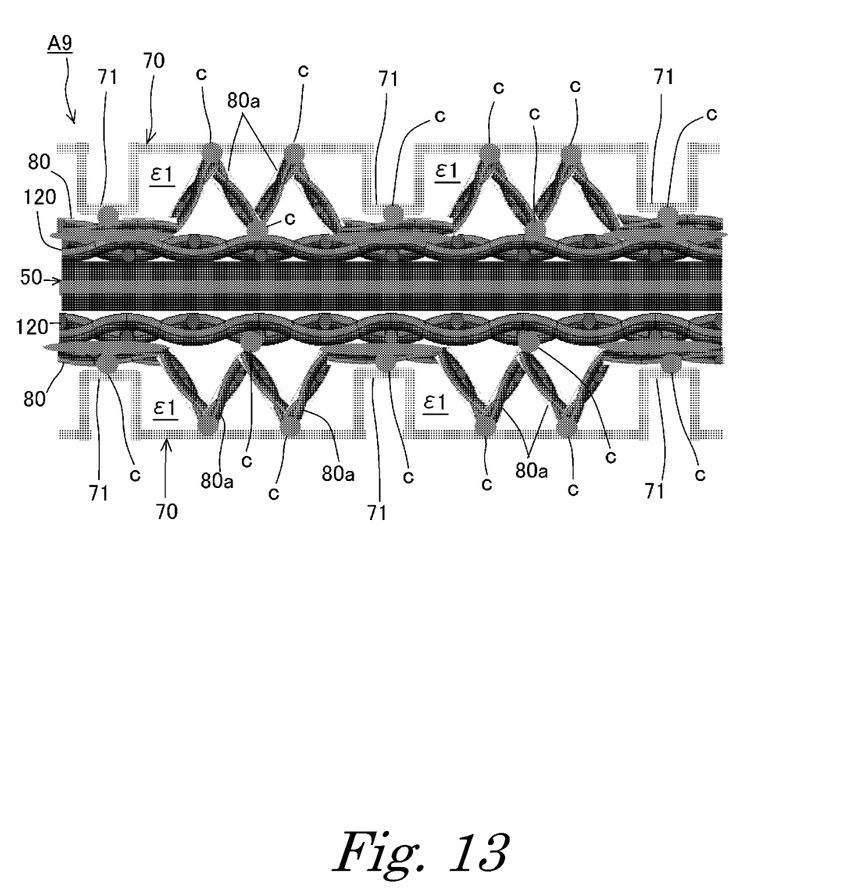
FIG. 13 is a partial enlarged cross sectional view of a fuel cell according to a ninth embodiment, which corresponds to a part of the section taken along the line I-I of FIG. 3(A).

Fuel cells according to eighth and ninth embodiments will be described with reference to FIGS. 12 and 13. FIGS. 12 and 13 are partial enlarged cross sectional views of the fuel cells according to the eighth and ninth embodiments, which correspond to a part of the section taken along the line I-I of FIG. 3(A). Components that are similar to those of the above-described embodiments are referred by the same reference signs, and the description thereof is omitted.

The fuel cell A8 according to the eighth embodiment is configured such that folded portions 80a, 80a of electrically conductive porous substrate 80, 80 are fixed to respective separators 70, 70, and ribs 71, 71 to the respective electrically conductive porous substrates 80, 80 by, for example, resistance welding or spot welding. In the figure, the welded parts are designated by "b". In this embodiment, intermediate layers 130 are interposed between the supports 120 and the membrane electrode assembly 50. The intermediate layers 130 reduce the stress on the membrane electrode assembly applied from the supports 120. The intermediate layers 130 are protective layers such as MPL (microporous layers) of a carbon material. When the supports are made of a metal mesh or the like, the uneven surface due to the woven threads or the like may dig into and break the catalyst layers and the membrane electrode assembly. The intermediate layers (protective layers) can serve as a cushion material for preventing such breakage.

The fuel cell A9 according to the ninth embodiment is configured such that folded portions 80a, 80a of electrically conductive porous substrate 80, 80 are fixed to respective separators 70, 70, and ribs 71, 71 to the respective electrically conductive porous substrates 80, 80 by welding, and the electrically conductive porous substrates 80, 80 are further fixed to respective supports 120, 120 by welding. In the figure, the welded parts are designated by "c".

With the above-described fuel cells A8, A9, the following advantageous effects can be obtained.

The joined contact points can reduce the electrical resistance.

In particular, the thermal joining between the electrically conductive porous substrates and the separators is carried out by a welding step in which the overlapped two components are welded with each other while a load is being applied to them. This can reduce the thickness and improve unevenness of the corrugated metal meshes. This is because the corrugated metal meshes are deformed according to the height of the ribs 71 of the rigid separators.

While the present invention is described in detail, the components of the above-described embodiments are applicable not only to the respective original embodiments but also to the other embodiments. A component of a certain embodiment may be applied to the other embodiment with or without modifications, or may be suitably combined to other components.

The invention claimed is:

1. A fuel cell, comprising:
a membrane electrode assembly comprising an electrolyte membrane and catalyst layers joined on both sides of the electrolyte membrane; and
a pair of separators disposed at both sides of the membrane electrode assembly to respectively form gas flow spaces where two types of power generation gases flow, wherein:
an electrically conductive porous substrate and a gas flow path dividing member are disposed in at least one of the gas flow spaces defined on both sides of the membrane electrode assembly,
the electrically conductive porous substrate is folded in a corrugated shape,
the gas flow path dividing member dividing a gas flow space into a plurality of gas flow paths is substantially parallel to a flow direction of the power generation gases, and
folded portions of the electrically conductive porous substrate extending into the gas flow paths further dividing the gas flow paths.

2. The fuel cell according to claim 1, wherein the gas flow path dividing member is formed by forming the separator in an uneven shape.

3. The fuel cell according to claim 1, wherein a support made of an electrically conductive porous substrate is disposed between the electrically conductive porous substrate and the membrane electrode assembly.

4. The fuel cell according to claim 3, wherein the support is disposed in both of the gas flow spaces.

5. The fuel cell according to claim 3, wherein the electrically conductive porous substrate and the support are made of a metal or are covered with a metal on the surface thereof.

6. The fuel cell according to claim 5, wherein the electrically conductive porous substrate and the support are made of a metal mesh that is rolled in a direction of reducing a plate thickness.

7. The fuel cell according to claim 3, wherein the electrically conductive porous substrate is fixed on the support or the separators or on both of the support and the separators.

8. The fuel cell according to claim 3, wherein an intermediate layer to reduce a stress on the membrane electrode assembly applied from the support is disposed between the support and the membrane electrode assembly.

* * * * *